United States Patent Office 2,705,247
Patented Mar. 29, 1955

2,705,247

1,6-DICHLORO-1,2,3,4,5,6-HEXAFLUORO-1,3,5-HEXATRIENE

Robert P. Ruh and Ralph A. Davis, Midland, Mich., assignors to The Dow Chemical Company, Midland, Mich., a corporation of Delaware No Drawing. Application November 18, 1953,
Serial No. 393,006

2 Claims. (Cl. 260—653)

This invention concerns a new compound, 1,6-dichloro-1,2,3,4,5,6-hexafluoro-1,3,5-hexatriene, and a method for its preparation.

This new compound $$CFCl=CF-CF=CF-CF=CFCl$$

is a colorless non-flammable liquid, being readily soluble in most of the common non-polar organic solvents but relatively insoluble in water. It can be employed as a chemical intermediate in the synthesis of other chemical compounds, e. g. 1,2,3,4,5,6-hexabromo-1,6-dichloro-1,2,3,4,5,6-hexafluorohexane by bromination, and can be polymerized to rubbery polymers having good thermal stability. This new dichlorohexafluorohexatriene exhibits strong parasiticidal activity against fungi, bacteria, and insects. Because of the high toxicity of its vapors to common granary insects, $$CFCl=CF-CF=CF-CF=CFCl$$

is surprisingly effective in the fumigation of grains and flours for the control of such organisms as the confused flour beetle, the black carpet beetle, and the granary weevil.

This new compound may be prepared by the dechlorination of 1,3,4,5,6,6 - hexachloro - 1,2,3,4,5,6 - hexafluorohexene - 1 with zinc in the presence of a lower alkanol under essentially anhydrous conditions. The alkanols which may advantageously be employed in the instant process are those having less than six carbon atoms per molecule, such as methanol, ethanol, isopropanol, sec-butanol, etc. Usually $$CFCl=CF-CFCl-CFCl-CFCl-CFCl_2$$

is dissolved in absolute ethanol and gradually added to a slurry of powdered zinc and absolute ethanol. Slightly greater than two atomic proportions of zinc per molecular proportion of the chlorofluorohexene are generally employed. The dechlorination reaction is highly exothermic and may be represented by the following equation:

$$CFCl=CF-CFCl-CFCl-CFCl-CFCl_2+2Zn\rightarrow$$
$$CFCl=CF-CF=CF-CF=CFCl+2ZnCl_2$$

This step may be carried out in a glass flask or ceramic-lined vessel equipped with a water-cooled reflux condenser. The dechlorination proceeds quite rapidly at a temperature in the range of 20° to 100° C. and is conveniently conducted at the reflux temperature of the reaction mixture, i. e. approximately 80° C. when ethanol is the alcoholic solvent. The rate at which 1,6-dichloro-1,2,3,4,5,6-hexafluoro-1,3,5-hexatriene is formed is roughly proportional to the rate of addition of the chlorofluorohexene reactant, i. e. dechlorination occurs almost instantaneously upon combining the reactants. Following the addition of all the chlorofluorohexene, the reaction mixture is ordinarily heated for a short period of time to insure essentially complete reaction. At the end of the heating period, the organic reaction product is usually cooled, washed with water, and dried. The dry organic product so obtained may then be subjected to fractional distillation to separate $$CFCl=CF-CF=CF-CF=CFCl$$

therefrom.

The following example describes the preparation of 1,6-dichloro-1,2,3,4,5,6-hexafluoro-1,3,5-hexatriene and gives some of the physical constants of this new compound.

*Example*

The dechlorination of 1,3,4,5,6,6-hexachloro-1,2,3,4,5,6-hexafluorohexene-1 obtained by the trimerization of CFCl=CFCl as hereinafter described was carried out in a glass flask equipped with a dropping funnel, reflux condenser, and mechanical stirring device. Into this flask charged with a slurry of 131 grams (2.0 moles) of powdered zinc in absolute ethanol was gradually added approximately 312 grams (0.78 mole) of $$CFCl=CF-CFCl-CFCl-CFCl-CFCl_2$$

dissolved in a roughly equal volume of absolute ethanol. The addition required 2 hours, the rate of addition being such as to maintain a steady reflux of the absolute ethanol. When all of the alcoholic solution of $$CFCl=CF-CFCl-CFCl-CFCl-CFCl_2$$

had been added to the flask, the reaction mixture was heated under reflux for a short period of time and thereafter cooled, washed with water, and dried with anhydrous calcium chloride. The dry reaction product so treated was subjected to fractional distillation. There was obtained 102 grams (0.40 mole) of crude $$CFCl=CF-CF=CF-CF=CFCl$$

boiling at 122° to 137° C. A portion of this crude $$CFCl=CF-CF=CF-CF=CFCl$$

was purified by another fractional distillation and a colorless liquid was obtained having a boiling point of 132° to 134° C., a density of 1.6116 at 25° C., and a refractive index (n/D) of 1.4324 at 25° C. This liquid was identified as CFCl=CF—CF=CF—CF=CFCl by mass spectrometry and other analyses. The halogen content of this compound as determined by chemical analyses is as follows: 27.86 per cent chlorine (theory=27.63 per cent Cl) and 43.6 per cent fluorine (theory=44.36 per cent F).

The 1,6-dichloro-1,2,3,4,5,6-hexafluoro-1,3,5-hexatriene so prepared was tested as an insecticidal fumigant by exposing a considerable number of confused flour beetle adults to its vapors in a closed chamber at a temperature of about 25° C. After a period of 16 hours at a concentration of 0.5 pound CFCl=CF—CF=CF—CF=CFCl per 1000 cubic feet of space, a 100 per cent kill of these insects was obtained.

The CFCl=CF—CFCl—CFCl—CFCl—CFCl_2 starting material employed in the above-described dechlorination reaction was prepared by the trimerization of 1,2-dichloro-1,2-difluoroethylene and probably contained a small proportion of hexachloro-1,2,3,4,5,6-hexafluorohexene-2 or -3 or both. The CFCl=CFCl employed in the trimerization reaction was a mixture of cis and trans isomers boiling at approximately 22° C. Approximately 1729 grams (13 moles) of liquid $$CFCl=CFCl$$

was charged into a cylindrical four-liter steel reaction vessel evacuated to 1 mm. mercury absolute pressure and cooled to below 10° C. The steel reaction vessel so charged was rapidly heated to 275° C. and maintained at this temperature under conditions of good agitation throughout the heating period. At the start of the reaction, the pressure rose rapidly to a maximum of 1500 pounds per square inch gauge and then dropped slowly to 185 p. s. i. g. after about 6 hours. Heating was continued for approximately 11 hours longer and at the end of this time, the pressure had fallen off to about 120 p. s. i. g. The reaction vessel and its contents were then cooled below 10° C. and the liquid reaction product weighing 1697 grams removed and subjected to fractional distillation. In addition to 60 grams of the recovered starting material CFCl=CFCl, there were obtained 1180 grams of dimeric CFCl=CF—CFCl—CFCl_2, 90 grams of an intermediate fraction boiling between the water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

*Example 1*

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

*Example 2*

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

*Example 3*

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

*Example 4*

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

*Example 5*

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

*Example 6*

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

*Example 7*

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.